United States Patent
Iwasaki et al.

(10) Patent No.: US 7,141,316 B2
(45) Date of Patent: Nov. 28, 2006

(54) PERPENDICULAR MAGNETIC RECORDING MEDIUM AND MAGNETIC RECORDING/REPRODUCING APPARATUS

(75) Inventors: Takeshi Iwasaki, Funabashi (JP); Takashi Hikosaka, Tokyo (JP); Soichi Oikawa, Chiba (JP); Futoshi Nakamura, Ichikawa (JP); Tomoyuki Maeda, Funabashi (JP); Hiroshi Sakai, Ichihara (JP); Kenji Shimizu, Ichihara (JP); Akira Sakawaki, Ichihara (JP)

(73) Assignees: Kabushiki Kaisha Toshiba, Tokyo (JP); Showa Denko K. K., Tokyo (JP)

( * ) Notice: Subject to any disclaimer, the term of this patent is extended or adjusted under 35 U.S.C. 154(b) by 11 days.

(21) Appl. No.: 10/801,563

(22) Filed: Mar. 17, 2004

(65) Prior Publication Data
US 2004/0191466 A1   Sep. 30, 2004

(30) Foreign Application Priority Data
Mar. 31, 2003   (JP) .............................. 2003-097316

(51) Int. Cl.
 *G11B 5/65* (2006.01)
(52) U.S. Cl. ................. 428/828; 428/831.2; 428/836.3
(58) Field of Classification Search ............ 428/694 T, 428/694 TS, 828, 831, 831.2, 836.2, 611, 428/836.3; 335/302; 148/302
See application file for complete search history.

(56) References Cited

U.S. PATENT DOCUMENTS

| | | | |
|---|---|---|---|
| 4,722,869 A | 2/1988 | Honda et al. | |
| 5,792,564 A | 8/1998 | Hikosaka et al. | |
| 5,942,342 A | 8/1999 | Hikosaka et al. | |
| 6,183,893 B1 | 2/2001 | Futamoto et al. | |
| 6,699,600 B1 * | 3/2004 | Shimizu et al. | 428/828 |
| 6,884,520 B1 * | 4/2005 | Oikawa et al. | 428/836.2 |
| 2002/0028355 A1 | 3/2002 | Nakamura et al. | |
| 2002/0086187 A1 | 7/2002 | Lee | |
| 2002/0136926 A1 * | 9/2002 | Oikawa et al. | 428/694 T |
| 2003/0044649 A1 | 3/2003 | Takizawa et al. | |
| 2003/0157375 A1 * | 8/2003 | Uwazumi et al. | 428/694 T |
| 2004/0020569 A1 * | 2/2004 | Kanekiyo et al. | 148/302 |
| 2004/0051614 A1 * | 3/2004 | Kanekiyo et al. | 335/302 |
| 2004/0224185 A1 * | 11/2004 | Nakamura et al. | 428/694 TS |

FOREIGN PATENT DOCUMENTS

| | | |
|---|---|---|
| JP | 2002-25030 | 1/2002 |
| JP | 2003-36525 | 2/2003 |

OTHER PUBLICATIONS

Austrian Search Report dated Nov. 11, 2004 for Appln. No. 200400898-3.

* cited by examiner

*Primary Examiner*—Carol Chaney
*Assistant Examiner*—Louis de Falasco
(74) *Attorney, Agent, or Firm*—Pillsbury Winthrop Shaw Pittman, LLP

(57) ABSTRACT

Disclosed is a perpendicular magnetic recording medium in which an undercoating layer having crystal grains and a grain boundary material containing a carbide or boride is formed below a perpendicular magnetic recording layer, and another undercoating layer containing one of elements forming the crystal grains is formed below the aforementioned undercoating layer, and which can perform high☐density recording by further decreasing the grain size of the perpendicular magnetic recording layer.

13 Claims, 4 Drawing Sheets

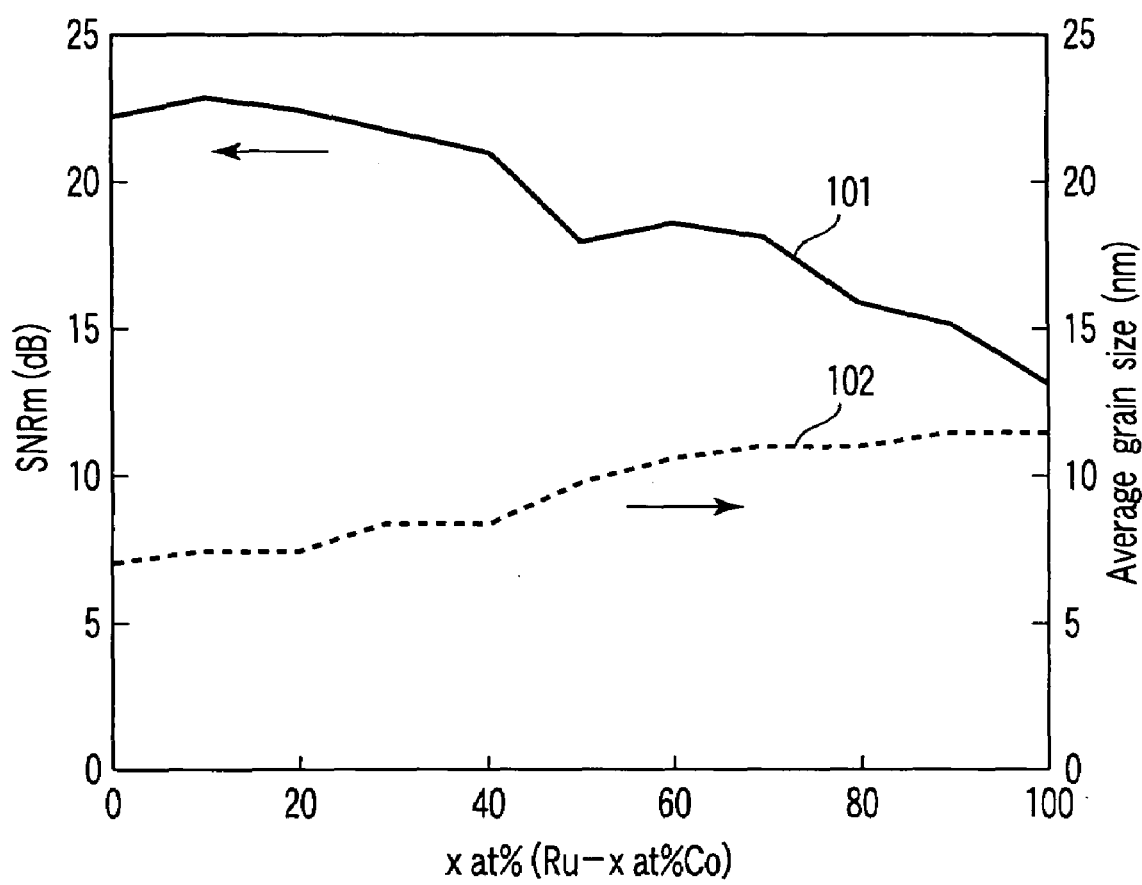
F I G. 6

PERPENDICULAR MAGNETIC RECORDING MEDIUM AND MAGNETIC RECORDING/REPRODUCING APPARATUS

CROSS-REFERENCE TO RELATED APPLICATIONS

This application is based upon and claims the benefit of priority from prior Japanese Patent Application No. 2003-097316, filed Mar. 31, 2003, the entire contents of which are incorporated herein by reference.

BACKGROUND OF THE INVENTION

1. Field of the Invention

The present invention relates to a magnetic recording medium for use in a hard disk drive using the magnetic recording technique, and to a magnetic recording/reproducing apparatus using the magnetic recording medium.

2. Description of the Related Art

A magnetic storage device (hard disk drive;HDD) mainly used in computers to record and reproduce information is recently gradually extending its applications because of its large capacity, inexpensiveness, high data access speed, data holding reliability, and the like. The HDD is now used in various fields such as household video decks, audio apparatuses, and car navigation systems. As the range of use of the HDD widens, demands for increasing the storage capacity or density of the HDD are also increasing. In recent years, high-density HDDs are being more and more extensively developed.

The longitudinal magnetic recording system is used in magnetic recording/reproducing apparatuses presently put on the market. In a magnetic recording layer used, magnetic grains for recording information have an easy axis of magnetization parallel to the substrate. The easy axis of magnetization is an axis in the direction of which magnetization easily points. In the case of a Co-based alloy, the c axis of the hexagonal closest packed structure of Co is the easy axis of magnetization. As the recording density increases, recording bits of a magnetic layer become small. If the recording bits are too small, information in these recording bits may be thermally erased by a so-called thermal decay effect, in other words, the recording/reproduction characteristics are worsened. Additionally, in a longitudinal magnetic recording medium, as the recording density increases, noise generated from the medium often increases due to the influence of an antimagnetic field generated in the boundary between the recording bits.

In contrast, in a so-called perpendicular magnetic recording system in which the easy axis of magnetization in the magnetic recording layer is aligned substantially perpendicularly to the substrate. The influence of an antimagnetic field between recording bits is small even when the recording density increases. The magnetization is magnetostatically stable even at high density. Therefore, this perpendicular magnetic recording system is recently very noted as a technique, which replaces the longitudinal recording system. The perpendicular magnetic recording medium is generally formed by a magnetic recording layer made up a hard magnetic material, an orientation control undercoating layer for orienting a specific crystal axis of the magnetic recording layer, and a protective layer for protecting the surface of the magnetic recording layer. In this perpendicular magnetic recording medium, a soft magnetic backing layer for concentrating a magnetic flux generated by a magnetic head used in recording to the magnetic recording layer is often formed between the magnetic recording layer and the substrate.

Even in the perpendicular magnetic recording medium, to increase the recording density, it is being desired to reduce noise while the thermal stability is maintained. Various methods can be used to obtain a fine structure in order to realize low noise. Generally, a method of decreasing the grain size of magnetic grains in the magnetic recording layer is used. In the case of a CoCr-based magnetic recording layer presently extensively used in both the longitudinal and perpendicular magnetic recording media, it has been attempted to decrease the grain size of magnetic grains by adding Ta or B to the magnetic recording layer or heating the layer at an appropriate temperature, thereby segregating nonmagnetic Cr in its grain boundary. However, the degree of this Cr segregation in the perpendicular magnetic recording medium is smaller than that in the longitudinal magnetic recording medium. Therefore, separation between the magnetic grains is insufficient, so the magnetic interaction between the grains remains relatively large. This poses the problem that transition noise between recording bits cannot be well reduced.

As another method of decreasing the size of magnetic grains, it is possible to decrease the grain size of an orientation control undercoating layer which is formed below a magnetic layer in order to control the orientation of the crystal axis and grain size of the magnetic layer. For example, Jpn. Pat. Appln. KOKAI Publication No. 2003-36525 discloses a method which uses an undercoating layer having a so-called granular structure made up of crystal grains and a grain boundary region separating the crystal grains by using an oxide or nitride as an additive, thereby downsizing and separating the crystal forming the undercoating layer. Also, Jpn. Pat. Appln. KOKAI Publication No. 2002-25030 discloses a method of giving both a magnetic recording and undercoating layer a granular structure by using, e.g., titanium oxide or silicon oxide as an additive. However, if the amount of additive is increased to further increase the recording density, the magnetic recording layer readily degrades its orientation or magnetic characteristics. In addition, in a film having a granular structure, the orientation of crystal grains is often inferior even though downsizing of these crystal grains is achieved. Accordingly, because the downsizing of the magnetic recording layer formed on the undercoating layer often makes the crystallinity worse, it is impossible to well bring out the characteristics of the magnetic recording medium by the worse crystallinity of the magnetic recording layer. As described above, to obtain a perpendicular magnetic recording medium capable of high-density recording, further improvements of the structure, particularly the undercoating layer are being required.

BRIEF SUMMARY OF THE INVENTION

The present invention provides a perpendicular magnetic recording medium characterized by comprising a nonmagnetic substrate, a first undercoating layer formed on the nonmagnetic substrate, a second undercoating layer formed on the first undercoating layer and having crystal grains and a grain boundary region separating the crystal grains, and a perpendicular magnetic recording layer formed on the second undercoating layer, wherein the first undercoating layer contains at least one of elements forming the crystal grains of the second undercoating layer, and the grain boundary material contains at least one of a carbide and boride as a compound.

The present invention also provides a magnetic recording/reproducing apparatus characterized by comprising a perpendicular magnetic recording medium which comprises a nonmagnetic substrate, a first undercoating layer formed on the nonmagnetic substrate, a second undercoating layer formed on the first undercoating layer and having crystal grains and a grain boundary region separating the crystal grains, and a perpendicular magnetic recording layer formed on the second undercoating layer, and a recording/reproducing head, wherein the first undercoating layer contains at least one of elements forming the crystal grains of the second undercoating layer, and the grain boundary material contains at least one of a carbide and boride as a compound.

BRIEF DESCRIPTION OF THE SEVERAL VIEWS OF THE DRAWING

The accompanying drawings, which are incorporated in and constitute a part of the specification, illustrate presently embodiments of the invention and, together with the general description given above and the detailed description of the embodiments given below, serve to explain the principles of the invention.

FIG. 6 is a graph showing the relationship between the ratio of a crystal grain component in a first undercoating layer and the magnetic characteristics.

DETAILED DESCRIPTION OF THE INVENTION

Figure 1:
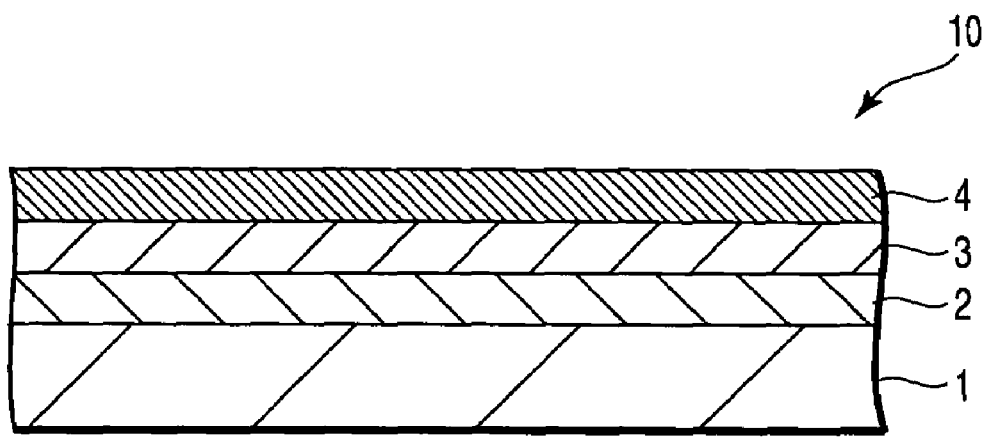
FIG. 1 is a sectional view showing the first example of a perpendicular magnetic recording medium of the present invention.

A perpendicular magnetic recording medium of the present invention has a nonmagnetic substrate, and a first undercoating layer, second undercoating layer, and perpendicular magnetic recording layer formed in this order on the nonmagnetic substrate.

The second undercoating layer contains crystal grains and a grain boundary region separating the crystal grains. The grain boundary material contains at least one of a carbide and boride.

Also, the first undercoating layer contains at least one of elements forming the crystal grains of the second undercoating layer.

A magnetic recording/reproducing apparatus of the present invention is an apparatus to which the above-mentioned perpendicular magnetic recording medium is applied, and comprises this perpendicular magnetic recording medium and a recoding/reproducing head.

In the perpendicular magnetic recording medium of the present invention, the second undercoating layer contains a large number of crystal grains, and a grain boundary region separating the crystal grains. This grain boundary region separates adjacent crystal grains. In the present invention, a carbide or boride is used as this grain boundary material, instead of an oxide or nitride which is widely used. Generally, when a deposition method such as sputtering which is used in the formation of a magnetic recording medium is used, a target material flies in an atomic state onto a substrate, and then returns to a compound state through recombination. If a gas element compound such as an oxide or nitride is used, the compound partially vaporizes as oxygen or nitrogen during film formation, so omission occurs in the compound. On the other hand, when a solid element compound such as a carbide or boride is used, no such omission easily occurs because no vaporization occurs. Accordingly, a carbide or boride has the advantage that no variations are found in crystallinity, and the variance of the magnetostatic characteristics and electromagnetic conversion characteristics is small. In addition, a carbide or boride has a melting point higher than that of an oxide, and hence does not easily form a solid solution with crystal grains and is more stable than an oxide. A nitride has a high melting point equivalent to that of a carbide or boride. However, a nitride has the disadvantage that when diffused in a magnetic layer, it disturbs the magnetic anisotropy of Co magnetic grains. In contrast, carbon or boron has no such adverse effect on the magnetic anisotropy even when diffused in a perpendicular magnetic recording layer. Also, especially when a CoPt-based magnetic layer to which Cr is added is used as a perpendicular magnetic recording layer, even if carbon or boron diffuses to this perpendicular magnetic recording layer during film formation, this carbon or boron has an effect of accelerating Cr segregation. Consequently, the recording/reproduction characteristics of the magnetic recording medium can be improved.

In the present invention, the first undercoating layer containing a material forming the crystal grains of the second undercoating layer is formed below the second undercoating layer. This makes it possible to improve disturbance of the crystallinity of crystal grains, which readily occurs in a film having crystal grains and a grain boundary region. By thus improving the crystallinity, the transition noise of the perpendicular magnetic recording layer formed on the second undercoating layer is further reduced.

FIG. 1 is a sectional view showing an example of the perpendicular magnetic recording medium of the present invention.

As shown in FIG. 1, a magnetic recording medium 10 has a structure in which a first undercoating layer 2, second undercoating layer 3, and perpendicular magnetic recording layer 4 are stacked in this order on a nonmagnetic substrate 1.

The first undercoating layer desirably contains 60 to 100 at % of at least one of elements forming crystal grains.

This further improves the crystallinity and further reduces the transition noise of the magnetic recording layer.

Also, as the crystal grains of the second undercoating layer, it is preferable to use a face-centered cubic structure or hexagonal closest packed structure when the crystal matching with the perpendicular magnetic recording layer is taken into consideration. This improves crystal growth in the second undercoating layer having the crystal grains and a grain boundary region and in the perpendicular magnetic recording layer formed on the second undercoating layer. Consequently, a fine perpendicular magnetic recording layer having high crystallinity is obtained.

As the material of the crystal grains, it is possible to use at least one type of element selected from the group consisting of Pt, Ru, Y, Pd, Re, and Rh.

In one embodiment, the grain boundary region of the second undercoating layer can be selected from the group consisting of $Al_4C_3$, HfC, $Mo_2C$, NbC, TaC, TiC, VC, WC, ZrC, $AlB_2$, $HfB_2$, $MoB_2$, NbB, $NbB_2$, TaB, $TaB_2$, $TiB_2$, $VB_2$, WB, $ZrB_2$, CrB, $CrB_2$, $CeB_6$, $LaB_6$, and $SmB_6$.

These compounds have the advantage that they have high melting points and are stable. Moreover in some embodiments, compounds are HfC, NbC, TaC, TiC, WC, ZrC, $HfB_2$, NbB, $TaB_2$, $TiB_2$, $VB_2$, $CeB_6$, $LaB_6$, and $SmB_6$. These compounds have an effect of decreasing the grain size while maintaining high crystallinity.

In one embodiment, the content of the grain boundary material in the second undercoating layer can be 1 to 50 mol %, and moreover in some embodiments, it can be 5 to 30 mol %. When the content of the grain boundary material falls within this range, the crystal grains are exposed to the surface of the second undercoating layer on which the perpendicular magnetic recording layer is formed, so a surface structure in which the crystal grains are separated by the grain boundary region is easily formed. This improves the crystal alignment of the perpendicular magnetic recording layer formed on the second undercoating layer.

If the content of the grain boundary material is less than 1 mol %, the effect of separating adjacent crystal grains in the second undercoating layer decreases, so the grain size of magnetic grains in the perpendicular magnetic recording layer often increases. If the content of the grain boundary material exceeds 50 mol %, the crystal grains are easily covered with the grain boundary region on the surface of the second undercoating layer. This often decreases the effect of improving the crystal alignment of the perpendicular magnetic recording layer.

In one embodiment, as the perpendicular magnetic recording layer, it is possible to use a CoCr-based alloy, CoPt-based alloy, CoCrPt-based alloy, CoPtO-based alloy, CoPtCrO-based alloy, CoPt—$SiO_2$-based alloy, CoCrPtB-based alloy, and CoCrPt—$SiO_2$-based alloy. Most favorably, an alloy containing Co, Cr, and Pt can be used.

These alloys have the advantage that they have high crystal alignment, strong magnetic anisotropy, and high thermal decay resistance.

A soft magnetic layer can be formed between the first undercoating layer and substrate.

When a soft magnetic layer having high magnetic permeability is formed, a so-called double-layered perpendicular medium having a perpendicular magnetic recording layer on this soft magnetic layer is obtained. In this double-layered perpendicular medium, the soft magnetic layer performs part of that function of a magnetic head, which horizontally passes the recording magnetic field from a magnetic head, e.g., a single-pole head for magnetizing the perpendicular magnetic recording layer, and returns the recording magnetic field to the magnetic head. That is, the soft magnetic field can apply a steep sufficient perpendicular magnetic field to the magnetic recording layer, thereby increasing the recording/reproduction efficiency.

As the soft magnetic material, it is possible to use CoZrNb, CoTaZr, FeCoB, FeCoN, FeTaC, FeTaN, FeNi, and FeAlSi, each of which has a high saturation magnetic flux density and favorable soft magnetic characteristics.

In addition, a bias application layer such as a longitudinal hard magnetic film or antiferromagnetic film can be formed between the soft magnetic layer and substrate. The soft magnetic layer readily forms a magnetic domain, and this magnetic domain generates spike noise. The generation of a magnetic wall can be prevented by applying a magnetic field in one direction of the radial direction of the bias application layer, thereby applying a bias magnetic field to the soft magnetic layer formed on the bias application layer. It is also possible to give the bias application layer a stacked structure to finely disperse the anisotropy and make a large magnetic domain difficult to form.

Examples of the bias application layer material are CoCrPt, CoCrPtB, CoCrPtTa, CoCrPtC, CoCrPtCuB, CoCrRuB, CoCrPtWC, CoCrPtWB, CoCrPtTaNd, CoSm, CoPt, CoPtO, CoCrPtO, CoPt—$SiO_2$, and CoCrPtO—$SiO_2$.

As the nonmagnetic substrate, it is possible to use, e.g., a glass substrate, an Al-based alloy substrate, an Si single-crystal substrate having an oxidized surface, ceramics, and plastic. Similar effects can be expected even when the surface of any of these nonmagnetic substrates is plated with an NiP alloy or the like.

A protective layer can be formed on the magnetic recording layer. Examples of this protective layer are C, diamond-like carbon (DLC), $SiN_x$, $SiO_x$, and $CN_x$.

As sputtering, it is possible to use single-element sputtering using a composite target, or multi-element simultaneous sputtering using targets of individual materials.

Figure 2:
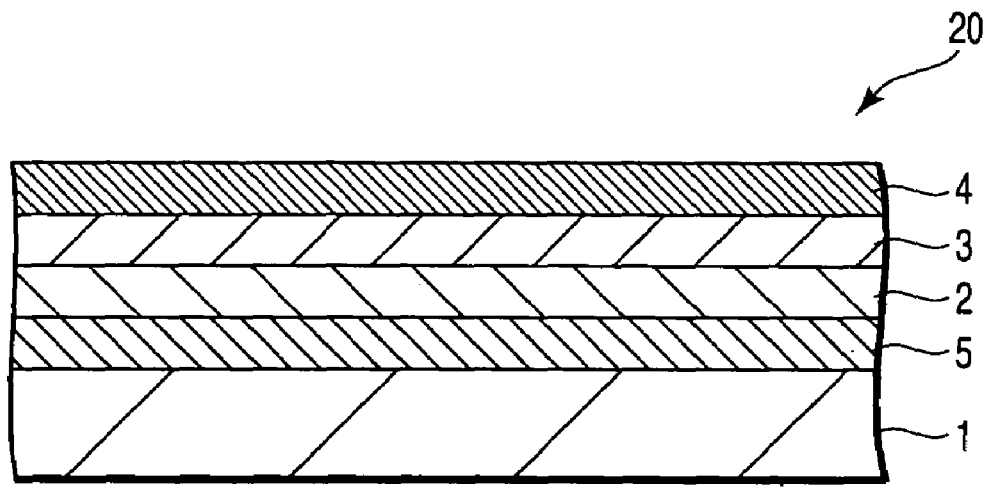
FIG. 2 is a sectional view showing the second example of the perpendicular magnetic recording medium of the present invention.

FIG. 2 is a sectional view showing another example of the perpendicular magnetic recording medium of the present invention.

As shown in FIG. 2, a perpendicular magnetic recording medium 20 has the same arrangement as shown in FIG. 1 except that a soft magnetic layer 5 is formed between a substrate 1 and first undercoating layer 2.

Figure 3:
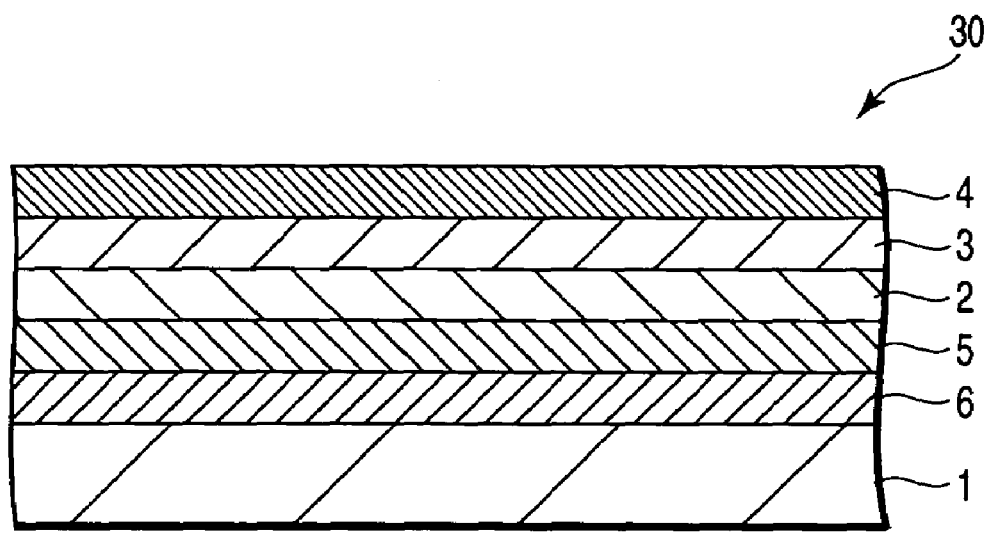
FIG. 3 is a sectional view showing the third example of the perpendicular magnetic recording medium of the present invention.

FIG. 3 is a sectional view showing still another example of the perpendicular magnetic recording medium of the present invention.

As shown in FIG. 3, a perpendicular magnetic recording medium 30 has the same arrangement as shown in FIG. 2 except that a bias application layer 6 is formed between a substrate 1 and soft magnetic layer 5.

Note that the first undercoating layer, second undercoating layer, soft magnetic layer, and bias application layer can be formed by a deposition method such as sputtering.

Figure 4:
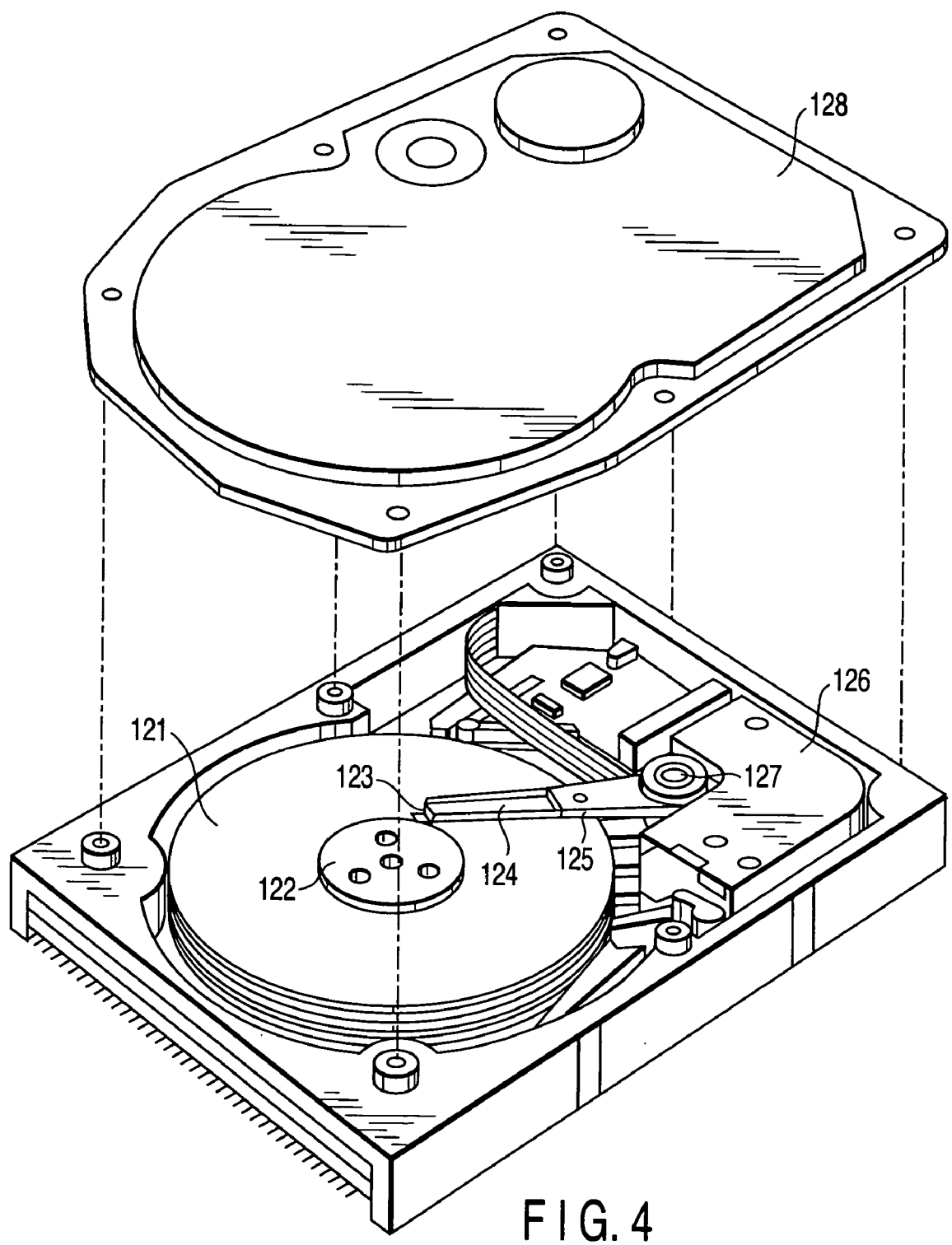
FIG. 4 is a partially exploded perspective view of an example of a magnetic recording/reproducing apparatus of the present invention.

FIG. 4 is a partially exploded perspective view showing an example of the magnetic recording/reproducing apparatus of the present invention.

A rigid magnetic disk 121 for recording information according to the present invention is fitted on a spindle 122 and rotated at a predetermined rotational speed by a spindle motor (not shown). A slider 123 bearing a single-pole recording head for accessing the magnetic disk 121 to record information and an MR head for reproducing information is attached to the end portion of a suspension 124 which is a thin leaf spring. The suspension 124 is connected to one end of an arm 125 having, e.g., a bobbin which holds a driving coil (not shown).

A voice coil motor 126 as a kind of a linear motor is attached to the other end of the arm 125. The voice coil motor 126 includes the driving coil (not shown) wound around the bobbin of the arm 125, and a magnetic circuit having a permanent magnetic and counter yoke opposing each other on the two sides of the driving coil.

The arm 125 is held by ball bearings (not shown) formed in two, upper and lower portions of a fixed shaft 127, and pivoted by the voice coil motor 126. That is, the position of the slider 123 on the magnetic disk 121 is controlled by the voice coil motor 126. Reference numeral 128 in FIG. 4 denotes a lid.

EMBODIMENTS

The present invention will be described in detail below by way of its embodiments.

Embodiment 1

A nonmagnetic glass substrate for a 2.5-inch magnetic disk was prepared.

This nonmagnetic substrate was set in a vacuum chamber having a vacuum degree of $1 \times 10^{-5}$ Pa. The substrate temperature was raised to 250° C., and DC magnetron sputtering was performed in an Ar ambient at a gas pressure of 0.6 Pa.

First, the nonmagnetic substrate was opposed to a target, and DC 500 W was discharged to the target to form a 40-nm thick Cr layer as a backing nonmagnetic layer. On this Cr layer, a 25-nm thick CoCrPt ferromagnetic layer was formed as a bias application layer. On the obtained CoCrPt ferromagnetic layer, a 200-nm thick CoZrNb soft magnetic layer was formed.

After that, the substrate temperature was lowered to room temperature in the vacuum chamber having a vacuum degree of $1 \times 10^{-5}$ Pa. On the CoZrNb soft magnetic layer, a 5-nm thick Pt layer was formed as a first undercoating layer by performing discharge at DC 500 W by using a Pt target. On this Pt layer, a 10-nm thick Pt—WC film was formed as a second undercoating layer by performing discharge on a Pt-20 mol % WC composite target at DC 500 W.

Then, a Co-16 at % Cr-10 at % Pt-8 mol % $SiO_2$ composite target was prepared, and a 15-nm thick CoCrPt—$SiO_2$ perpendicular magnetic recording layer was formed on the Pt—WC undercoating layer.

Finally, a 7-nm thick C protective layer was formed.

After the substrate on which the films were thus continuously formed in the vacuum chamber was extracted into the atmosphere, a 1.5-nm thick perfluoro polyether-based lubricating film was formed by dipping, thereby obtaining a perpendicular magnetic recording medium.

Also, a testing medium of this perpendicular magnetic recording medium was obtained following the same procedures as above except that no CoCrPt—$SiO_2$ perpendicular magnetic recording layer was formed on the Pt—WC second undercoating layer.

Figure 5:
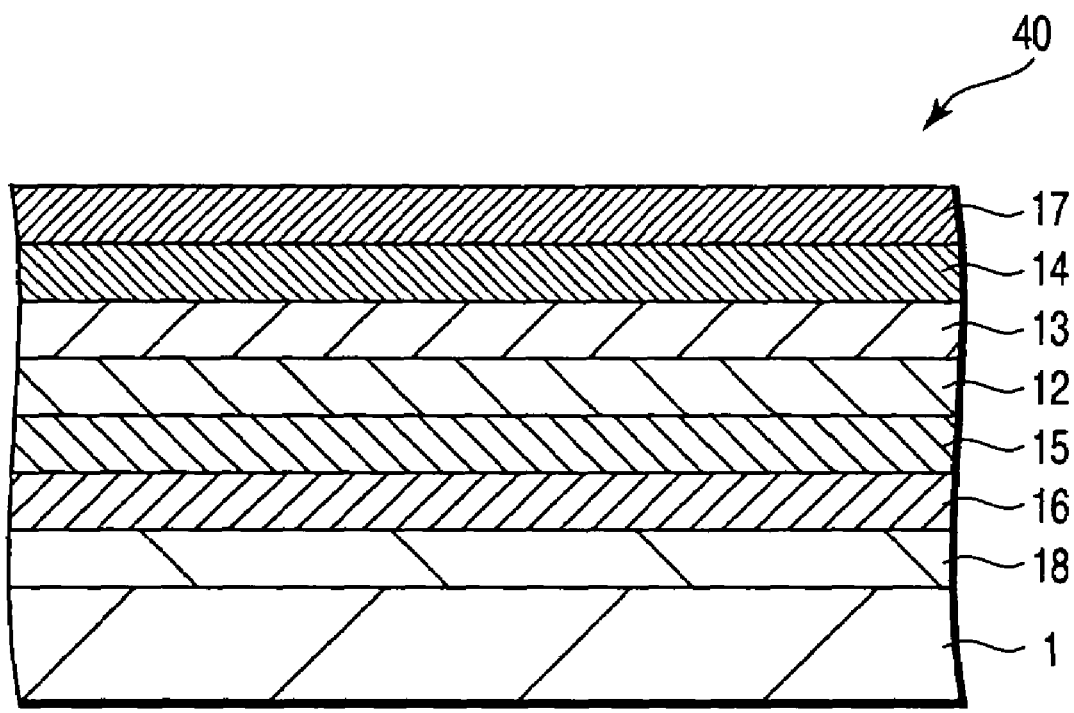
FIG. 5 is a sectional view showing the fourth example of the perpendicular magnetic recording medium of the present invention.

FIG. 5 is a schematic sectional view showing the arrangement of the obtained perpendicular magnetic recording medium.

As shown in FIG. 5, a perpendicular magnetic recording medium 40 has a structure in which a Cr nonmagnetic film 18, CoCrPt ferromagnetic layer 16, CoZrNb soft magnetic layer 15, Pt first undercoating layer 12, Pt—WC second undercoating layer 13, CoCrPt—$SiO_2$ perpendicular magnetic recording layer 14, C protective layer 17, and lubricating layer (not shown) are stacked in this order on a nonmagnetic substrate 1.

First, the grain size distribution of the second undercoating layer of the testing medium was checked by using a transmission electron microscope (TEM). As a result, crystal grains mainly containing Pt and a grain boundary region separating these Pt grains and mainly containing WC were found. The crystal grain size of the crystal grains was approximately 5 to 7 nm.

Also, when the crystal alignment of the second undercoating layer was checked by using X-ray diffraction measurement, a Pt (111) peak was observed.

Furthermore, rocking curve measurement was performed on this Pt (111) peak. Consequently, the obtained peak half-width was 5°, a favorable value, indicating that the crystallinity of the crystal grains was high.

In addition, TEM measurement was performed on the perpendicular magnetic recording layer of the obtained perpendicular magnetic recording medium, thereby checking the grain size distribution of the magnetic grains in the perpendicular magnetic recording layer. As a consequence, fine Co magnetic grains having a grain size distribution of 5 to 7 nm were observed.

When X-ray diffraction measurement was performed on this perpendicular magnetic recording layer, a strong CoCrPt—$SiO_2$ (00.2) peak was observed. Rocking curve measurement was performed on this CoCrPt—$SiO_2$ (00.2) peak, and the obtained peak half-width was 6°, indicating high crystallinity.

By using a magnetizing apparatus having an electromagnet, a magnetic field of 1,185 A/m (15 kOe) was applied to the obtained perpendicular magnetic recording medium from the inside to the outside in the radiation direction of the disk-like substrate, thereby magnetizing the ferromagnetic layer as a bias application layer in the longitudinal radial direction.

The recording/reproduction characteristics of the thus magnetized perpendicular magnetic recording medium were evaluated by using a read write analyzer 1632 and spin stand S1701MP available from Guzik Technical Enterprises of the U.S.A. As a recording/reproducing head, a head using a single magnetic pole as a recording unit and a magnetoresistive effect as a reproducing element was used. This recording/reproducing head had a recording track width of 0.25 μm and a reproducing track width of 0.15 μm. The measurement was performed at a disk rotational speed of 4,200 rpm in a fixed position 22.2 mm from the center in the radial direction.

Consequently, the value of SNRm (reproduction signal output S: an output at a linear recording density of 119 kFCI, Nm: an rms (root mean square) value at 716 kFCI) of the medium was 23.8 dB, i.e., a good medium was obtained.

COMPARATIVE EXAMPLE 1

A comparative perpendicular magnetic recording medium was obtained following the same procedures as for the perpendicular magnetic recording medium of Embodiment 1 except that on a nonmagnetic substrate, a 5-nm thick Ti layer was formed as a first undercoating layer by using a Ti target, and a 20-nm thick Ru layer was formed as a second undercoating layer by using an Ru target.

The obtained perpendicular magnetic recording medium had the same layer arrangement as that of the perpendicular magnetic recording medium shown in FIG. 5 except for the first and second undercoating layers.

In addition, a testing medium was obtained in the same manner as for the above perpendicular magnetic recording medium except that no perpendicular magnetic recording layer was formed on the Ru second undercoating layer.

The grain size distribution on the surface of the Ru second undercoating layer of the obtained testing medium was checked by using the TEM. As a result, the crystal grain size was approximately 10 to 13 nm.

When the crystal alignment of the second undercoating layer was checked by using X-ray diffraction measurement, an Ru (00.2) peak was observed. Rocking curve measurement was performed on this Ru (00.2) peak, and the obtained peak half-width was 9°.

Also, TEM measurement was performed on the perpendicular magnetic recording layer of the obtained perpendicular magnetic recording medium, thereby checking the grain size distribution of the magnetic grains in the perpendicular magnetic recording layer. As a consequence, the magnetic grains had a grain size distribution of 10 to 14 nm.

When X-ray diffraction measurement was performed on this perpendicular magnetic recording layer, a CoCrPt—SiO$_2$ (00.2) peak was observed.

Rocking curve measurement was performed on this CoCrPt—SiO$_2$ (00.2) peak, and the obtained peak half-width was 10°.

When the recording/reproduction characteristics were evaluated in the same manner as in Embodiment 1, the value of SNRm was 19.8 dB.

Embodiment 2

As second undercoating layers, Pt-20 mol % MB$_x$ composite targets (M=Al, Hf, Nb, Ta, Ti, V, W, Zr, Cr, Ce, La, and Sm, x=1, 2, and 6) made of combinations of Pt and various metal borides as shown in Table 1 below were prepared. Perpendicular magnetic recording media and testing media were formed following the same procedures as in Embodiment 1 except that these various metal boride composite targets were used instead of the Pt-20 mol % WC composite target.

Each obtained perpendicular magnetic recording medium had the same layer arrangement as that of the perpendicular magnetic recording medium shown in FIG. 5 except for materials of the second undercoating layers.

When the surface of the second undercoating layer of each testing medium was observed with the TEM, crystal grains and a grain boundary region separating the crystal grains were found. The crystal grain size was approximately 4 to 9 nm.

TEM measurement, X-ray measurement, rocking curve measurement, and recording/reproduction characteristic evaluation were performed on the obtained perpendicular magnetic recording media in the same manner as in Embodiment 1. The results are also shown in Table 1 below.

TABLE 1

| Boride | Grain size distribution (nm) of second undercoating layer | Grain size distribution (nm) of magnetic grains | Rocking curve half-width (°) | SNRm (dB) |
|---|---|---|---|---|
| AlB$_2$ | 7–9 | 8–10 | 5 | 22.8 |
| HfB$_2$ | 5–7 | 5–7 | 6 | 23.6 |
| MoB$_2$ | 6–8 | 7–9 | 6 | 23.4 |
| NbB | 5–7 | 5–8 | 4 | 23.1 |
| NbB$_2$ | 6–8 | 6–8 | 6 | 22.9 |
| TaB | 5–9 | 6–9 | 4 | 23.4 |
| TaB$_2$ | 5–7 | 5–7 | 6 | 23.5 |
| TiB$_2$ | 4–7 | 5–7 | 5 | 23.2 |
| VB$_2$ | 5–7 | 6–8 | 5 | 23.0 |
| WB | 6–8 | 6–8 | 4 | 22.7 |
| ZrB$_2$ | 4–7 | 5–7 | 6 | 22.5 |
| CrB | 7–9 | 7–10 | 5 | 22.7 |
| CrB$_2$ | 6–8 | 7–9 | 4 | 23.2 |
| CeB$_6$ | 5–7 | 6–8 | 7 | 23.7 |
| LaB$_6$ | 5–8 | 6–8 | 7 | 23.1 |
| SmB$_6$ | 6–8 | 6–8 | 8 | 23.5 |
| Medium of Comparative Example 1 | 10–13 | 10–14 | 10 | 19.8 |

As shown in Table 1, characteristics better than those of the conventional medium of Comparative Example 1 were obtained by using various borides such as AlB$_2$, HfB$_2$, MoB$_2$, NbB, NbB$_2$, TaB, TaB$_2$, TiB$_2$, VB$_2$, WB, ZrB$_2$, CrB, CrB$_2$, CeB$_6$, LaB$_6$, and SmB$_6$.

Embodiment 3

As second undercoating layers, Ru-10 mol % M$_x$C$_y$ composite targets (M=Al, Hf, Nb, Ta, Ti, V, W, and Zr, x=1, 2, and 4, y=1 and 3) made of combinations of Ru and various metal carbides as shown in Table 2 below were prepared.

Perpendicular magnetic recording media and testing media were formed following the same procedures as in Embodiment 1 except that these various metal carbide composite targets were used instead of the Pt-20 mol % WC composite target, and Ru forming crystal grains of these second undercoating layers were used as first undercoating layers.

Each obtained perpendicular magnetic recording medium had the same layer arrangement as that of the perpendicular magnetic recording medium shown in FIG. 5 except for materials of the first and second undercoating layers.

When the surface of the second undercoating layer of each testing medium was observed with the TEM, crystal grains and a grain boundary region separating the crystal grains were found. The crystal grain size was approximately 4 to 9 nm.

TEM measurement, X-ray measurement, rocking curve measurement, and recording/reproduction characteristic evaluation were performed on the obtained perpendicular magnetic recording media in the same manner as in Embodiment 1. The results are also shown in Table 2 below.

TABLE 2

| Carbide | Grain size distribution (nm) of second undercoating Layer | Grain size distribution (nm) of magnetic grains | Rocking curve half-width (°) | SNRm (dB) |
|---|---|---|---|---|
| Al$_4$C$_3$ | 7–9 | 8–10 | 6 | 23.4 |
| HfC | 4–7 | 5–7 | 8 | 23.5 |
| Mo$_2$C | 7–9 | 7–9 | 6 | 22.8 |
| NbC | 5–7 | 5–7 | 6 | 23.0 |
| TaC | 4–7 | 5–7 | 5 | 23.8 |
| TiC | 5–7 | 5–8 | 7 | 23.4 |
| VC | 6–8 | 7–9 | 7 | 22.9 |
| WC | 5–7 | 5–7 | 6 | 23.8 |
| ZrC | 5–7 | 5–7 | 6 | 23.3 |
| Medium of Comparative Example 1 | 10–13 | 10–14 | 10 | 19.8 |

As shown in Table 2, characteristics better than those of the conventional medium of Comparative Example 1 were obtained by using various carbides such as Al$_4$C$_3$, HfC, MO$_2$C, NbC, TaC, TiC, VC, WC, and ZrC.

Embodiment 4

As second undercoating layers, Ru—MB$_x$ composite targets (M=Al, Hf, Nb, Ta, Ti, V, W, Zr, Cr, Ce, La, and Sm, x=1, 2, and 6) made of combinations of Ru and various metal borides as shown in Table 3 below were prepared by variously changing the addition amount of boride.

Perpendicular magnetic recording media and testing media were formed following the same procedures as in Embodiment 1 except that these various composite targets were used instead of the Pt-20 mol % WC composite target, and Ru forming crystal grains of these second undercoating layers were used as first undercoating layers.

Each obtained perpendicular magnetic recording medium had the same layer arrangement as that of the perpendicular magnetic recording medium shown in FIG. 5 except for materials of the first and second undercoating layers.

When the surface of the second undercoating layer of each testing medium was observed with the TEM, crystal grains and a grain boundary region separating the crystal grains were found. The crystal grain size was approximately 4 to 9 nm.

The recording/reproduction characteristics of the obtained perpendicular magnetic recording media were evaluated in the same manner as in Embodiment 1. The results are also shown in Table 3 below.

and 3) made of combinations of Pt and metal carbides and having various composition ratios were prepared. Table 4 below shows the metal carbides used and their addition amounts. Perpendicular magnetic recording media and testing media were formed following the same procedures as in Embodiment 1 except that these various metal carbide composite targets were used instead of the Pt-20 mol % WC composite target.

Each obtained perpendicular magnetic recording medium had the same layer arrangement as that of the perpendicular

TABLE 3

| | boride addition amount and SNRm (dB) | | | | | | | |
|---|---|---|---|---|---|---|---|---|
| Boride | 0 (mol %) | 1 (mol %) | 5 (mol %) | 10 (mol %) | 20 (mol %) | 30 (mol %) | 50 (mol %) | 80 (mol %) |
| $AlB_2$ | 18.1 | 19.2 | 19.6 | 20.3 | 21.3 | 21.5 | 19.1 | 18.6 |
| $HfB_2$ | 18.1 | 19.3 | 21.4 | 22.2 | 22.4 | 22.2 | 19.7 | 18.4 |
| $MoB_2$ | 18.1 | 19.6 | 19.8 | 20.3 | 22.6 | 21.4 | 19.2 | 18.9 |
| NbB | 18.1 | 19.2 | 19.7 | 20.3 | 23.1 | 22.6 | 21.2 | 18.6 |
| $NbB_2$ | 18.1 | 19.8 | 20.6 | 21.7 | 22.2 | 22.4 | 20.1 | 19.0 |
| TaB | 18.1 | 20.3 | 21.9 | 23.2 | 22.1 | 20.6 | 19.5 | 18.5 |
| $TaB_2$ | 18.1 | 19.0 | 19.5 | 21.9 | 22.7 | 23.3 | 20.8 | 18.6 |
| $TiB_2$ | 18.1 | 19.8 | 21.2 | 22.5 | 21.6 | 21.5 | 20.3 | 18.6 |
| $VB_2$ | 18.1 | 21.2 | 21.8 | 22.5 | 20.8 | 20.5 | 20.2 | 19.1 |
| WB | 18.1 | 20.3 | 20.7 | 21.5 | 22.4 | 20.1 | 18.8 | 19.0 |
| $ZrB_2$ | 18.1 | 19.5 | 21.0 | 22.8 | 22.6 | 22.0 | 20.5 | 18.9 |
| CrB | 18.1 | 19.3 | 19.9 | 20.2 | 20.7 | 20.8 | 19.1 | 18.5 |
| $CrB_2$ | 18.1 | 19.0 | 19.7 | 20.0 | 20.3 | 20.6 | 19.5 | 19.0 |
| $CeB_6$ | 18.1 | 19.2 | 20.7 | 21.3 | 23.6 | 23.4 | 22.4 | 18.7 |
| $LaB_6$ | 18.1 | 19.5 | 20.0 | 20.6 | 22.5 | 23.4 | 21.0 | 19.8 |
| $SmB_6$ | 18.1 | 19.3 | 20.1 | 21.2 | 21.8 | 20.9 | 18.9 | 18.3 |

As shown in Table 3, good characteristics were obtained when the addition amount of any of various borides such as $AlB_2$, $HfB_2$, $MOB_2$, NbB, $NbB_2$, TaB, $TaB_2$, $TiB_2$, $VB_2$, WB, $ZrB_2$, CrB, $CrB_2$, $CeB_6$, and $SmB_6$ with respect to Ru was 1 to 50 mol %. The boride addition amount with respect to Ru was more desirably 5 to 30 mol %.

Embodiment 5

As second undercoating layers, Pt-$M_xC_y$ composite targets (M=Al, Hf, Nb, Ta, Ti, V, W, and Zr, x=1, 2, and 4, y=1 magnetic recording medium shown in FIG. 5 except for materials of the second undercoating layers.

When the surface of the second undercoating layer of each testing medium was observed with the TEM, crystal grains and a grain boundary region separating the crystal grains were found. The crystal grain size was approximately 4 to 9 nm.

The recording/reproduction characteristics of the obtained perpendicular magnetic recording media were evaluated in the same manner as in Embodiment 1. The results are also shown in Table 4 below.

TABLE 4

| | Carbide addition amount and SNRm (dB) | | | | | | | |
|---|---|---|---|---|---|---|---|---|
| Carbide | 0 (mol %) | 1 (mol %) | 5 (mol %) | 10 (mol %) | 20 (mol %) | 30 (mol %) | 50 (mol %) | 80 (mol %) |
| $Al_4C_3$ | 17.6 | 18.7 | 19.6 | 20.3 | 21.2 | 22.3 | 22.3 | 19.6 |
| HfC | 17.6 | 20.0 | 20.8 | 21.2 | 21.3 | 21.5 | 18.8 | 18.0 |
| $Mo_2C$ | 17.6 | 19.2 | 19.7 | 20.5 | 22.0 | 22.8 | 19.9 | 18.5 |
| NbC | 17.6 | 20.3 | 20.4 | 20.5 | 21.5 | 20.3 | 19.1 | 18.3 |
| TaC | 17.6 | 19.8 | 20.6 | 21.2 | 21.9 | 23.8 | 22.5 | 21.1 |
| TiC | 17.6 | 21.1 | 21.8 | 22.4 | 23.5 | 23.4 | 22.1 | 18.6 |
| VC | 17.6 | 19.0 | 19.7 | 20.0 | 20.6 | 21.9 | 19.5 | 18.5 |
| WC | 17.6 | 20.5 | 21.3 | 22.8 | 23.3 | 23.8 | 21.4 | 20.5 |
| ZrC | 17.6 | 19.6 | 20.6 | 21.1 | 22.8 | 21.3 | 20.0 | 19.0 |

As shown in Table 4, good characteristics were obtained when the addition amount of any of various carbides such as $Al_4C_3$, HfC, $Mo_2C$, NbC, TaC, TiC, VC, WC, and ZrC with respect to Pt was 1 to 50 mol %. The carbide addition amount with respect to Pt was more desirably 5 to 30 mol %.

Embodiment 6

Perpendicular magnetic recording media and testing media were formed following the same procedures as in Embodiment 1 except that M-15 mol % TiC (M=Pt, Ru, Pd, Y, Re, and Rh) composite targets made of combinations of various metals and a carbide as shown in Table 5 below were used as second undercoating layers, and the same metals M (M=Pt, Ru, Pd, Y, Re, and Rh) as used in these second undercoating layers were used as first undercoating layers.

Each obtained perpendicular magnetic recording medium had the same layer arrangement as that of the perpendicular magnetic recording medium shown in FIG. 5 except for the first and second undercoating layers.

When the surface of the second undercoating layer of each testing medium was observed with the TEM, crystal grains and a grain boundary region separating the crystal grains were found. The crystal grain size was approximately 4 to 9 nm.

TEM measurement, X-ray measurement, rocking curve measurement, and recording/reproduction characteristic evaluation were performed on the obtained perpendicular magnetic recording media in the same manner as in Embodiment 1. The results are also shown in Table 5 below.

TABLE 5

| Target | Grain size distribution (nm) of second undercoating layer | Grain size distribution (nm) of magnetic grains | Rocking curve half-width (°) | SNRm (dB) |
|---|---|---|---|---|
| Pt-TiC | 4–7 | 4–7 | 6 | 22.8 |
| Ru-TiC | 5–7 | 5–8 | 7 | 23.4 |
| Pd-TiC | 5–7 | 5–7 | 9 | 22.8 |
| Y-TiC | 7–9 | 8–10 | 6 | 23.0 |
| Re-TiC | 4–7 | 5–7 | 5 | 23.7 |
| Rh-TiC | 5–8 | 6–8 | 7 | 23.4 |
| Medium of Comparative Example 1 | 10–13 | 10–14 | 10 | 19.8 |

As shown in Table 5, the perpendicular magnetic recording media of the present invention in which the various M-TiC (M=Pt, Ru, Pd, Y, Re, and Rh) targets were used as the second undercoating layers and the same metals M (M=Pt, Ru, Pd, Y, Re, and Rh) as used in the second undercoating layers were used as the first undercoating layers exhibited better characteristics than those of the conventional medium of Comparative Example 1.

Embodiment 7

Perpendicular magnetic recording media and testing media were formed following the same procedures as in Embodiment 1 except that M-15 mol % $HfB_2$ (M=Pt, Ru, Pd, Y, Re, and Rh) composite targets made of combinations of various metals and a boride as shown in Table 6 below were used as second undercoating layers, and the same metal M (M=Pt, Ru, Pd, Y, Re, and Rh) targets as used in the second undercoating layers were used as first undercoating layers.

Each obtained perpendicular magnetic recording medium had the same layer arrangement as that of the perpendicular magnetic recording medium shown in FIG. 5 except for the first and second undercoating layers.

When the surface of the second undercoating layer of each testing medium was observed with the TEM, crystal grains and a grain boundary region separating the crystal grains were found. The crystal grain size was approximately 5 to 8 nm.

TEM measurement, X-ray measurement, rocking curve measurement, and recording/reproduction characteristic evaluation were performed on the obtained perpendicular magnetic recording media in the same manner as in Embodiment 1. The results are also shown in Table 6 below.

TABLE 6

| Target | Grain size distribution (nm) of second undercoating layer | Grain size distribution (nm) of magnetic grains | Rocking curve half-width (°) | SNRm (dB) |
|---|---|---|---|---|
| Pt-$HfB_2$ | 5–7 | 5–7 | 7 | 22.3 |
| Ru-$HfB_2$ | 6–8 | 6–9 | 8 | 23.0 |
| Pd-$HfB_2$ | 6–8 | 6–9 | 8 | 23.2 |
| Y-$HfB_2$ | 6–8 | 7–9 | 6 | 22.5 |
| Re-$HfB_2$ | 5–8 | 6–8 | 7 | 23.0 |
| Rh-$HfB_2$ | 5–8 | 6–9 | 8 | 22.7 |
| Medium of Comparative Example 1 | 10–13 | 10–14 | 10 | 19.8 |

As shown in Table 6, the perpendicular magnetic recording media of the present invention in which the various M-$HfB_2$ (M=Pt, Ru, Pd, Y, Re, and Rh) targets were used as the second undercoating layers and the same metals M (M=Pt, Ru, Pd, Y, Re, and Rh) as used in the second undercoating layers were used as the first undercoating layers exhibited better characteristics than those of the conventional medium of Comparative Example 1.

Embodiment 8

Perpendicular magnetic recording media and testing media were formed following the same procedures as in Embodiment 1 except that Ru-xat % Co composite targets having various composition ratios were prepared as first undercoating layers and used to make the composition ratios of the first undercoating layers different from each other, and an Ru-25 mol % VC target was prepared as second undercoating layers to form Ru-25 mol % VC as second undercoating layers.

Each obtained perpendicular magnetic recording medium had the same layer arrangement as that of the perpendicular magnetic recording medium shown in FIG. 5 except for the first and second undercoating layers.

When the surface of the second undercoating layer of each testing medium was observed with the TEM, crystal grains and a grain boundary region separating the crystal grains were found. The crystal grain size was approximately 6 to 11 nm.

TEM measurement and recording/reproduction characteristic evaluation were performed on the obtained perpendicular magnetic recording media.

FIG. 6 is a graph showing the relationship between the Co content of Ru-xat % Co, SNRm, and the average grain size of magnetic grains, as the results of the measurements.

Referring to FIG. 6, curves 101 and 102 respectively show the average grain sizes of the magnetic grains.

FIG. 6 shows that the perpendicular magnetic recording media of the present invention exhibited good characteristics when the composition ratio of Ru-xat % Co in the first undercoating layers was such that Co was 40 at % or less, i.e., Ru was 60 at % or more.

Embodiment 9

Following the same procedures as in Embodiment 1, a Cr layer, CoCrPt ferromagnetic layer, and CoZrNb soft magnetic layer were formed on a glass substrate for a 2.5-inch magnetic disk.

Subsequently, without lowering the substrate temperature, a 5-nm thick Pt layer was formed as a first undercoating layer on the CoZrNb soft magnetic layer by performing discharge at DC 500 W by using a Pt target. On this Pt layer, a 10-nm thick Pt—$CeB_6$ layer was formed as a second undercoating layer by performing discharge on a Pt-30 mol % $CeB_6$ target at DC 500 W.

After that, a Co-18 at % Cr-16 at % Pt-1 at % B target was prepared, and a 25-nm thick CoCrPtB perpendicular magnetic recording layer was formed on the Pt—$CeB_6$ undercoating layer.

Finally, a 7-nm thick C protective layer was formed.

After the substrate on which the films were thus continuously formed in the vacuum chamber was extracted into the atmosphere, a 1.5-nm thick perfluoro polyether-based lubricating film was formed by dipping, thereby obtaining a perpendicular magnetic recording medium.

The obtained perpendicular magnetic recording medium had the same layer arrangement as that of the perpendicular magnetic recording medium shown in FIG. 5 except for the first and second undercoating layers.

In addition, a testing medium of this perpendicular magnetic recording medium was obtained following the same procedures as above except that no CoCrPtB perpendicular magnetic recording layer was formed on the second undercoating layer.

When the surface of the second undercoating layer of the testing medium was observed with the TEM, crystal grains and a grain boundary region separating the crystal grains were found. The crystal grain size was approximately 5 to 8 nm.

TEM measurement, X-ray measurement, rocking curve measurement, and recording/reproduction characteristic evaluation were performed on the obtained perpendicular magnetic recording medium in the same manner as in Embodiment 1.

Consequently, the perpendicular magnetic recording medium had a grain size distribution of 5 to 9 nm.

When X-ray diffraction measurement was performed on this perpendicular magnetic recording medium, a CoCrPtB (00.2) peak was observed.

Rocking curve measurement was performed on this CoCrPtB (00.2) peak, and the obtained peak half-width was 6°.

Also, when the recording/reproduction characteristics of the perpendicular magnetic recording medium were evaluated in the same manner as in Embodiment 1, the value of SNRm was 23.5 dB.

COMPARATIVE EXAMPLE 2

A conventional perpendicular magnetic recording medium was obtained following the same procedures as in Embodiment 9 except that on a nonmagnetic substrate, a 5-nm thick Ti film was formed as a first undercoating layer by using a Ti target, and a 20-nm thick Ru film was formed as a second undercoating layer by using an Ru target.

The obtained perpendicular magnetic recording medium had the same layer arrangement as that of the perpendicular magnetic recording medium shown in FIG. 5 except for materials of the first and second undercoating layers.

In addition, a testing medium was obtained in the same manner as for the above perpendicular magnetic recording medium except that no perpendicular magnetic recording layer was formed on the Ru second undercoating layer.

The grain size distribution on the surface of the Ru second undercoating layer of the obtained testing medium was checked by using the TEM. As a result, the crystal grain size was approximately 12 to 16 nm.

TEM measurement was performed on the perpendicular magnetic recording layer of the obtained perpendicular magnetic recording medium, thereby checking the grain size distribution of the magnetic grains in the perpendicular magnetic recording layer. As a consequence, the magnetic grains had a grain size distribution of 12 to 16 nm.

When X-ray diffraction measurement was performed on this perpendicular magnetic recording layer, a CoCrPtB (00.2) peak was observed.

Rocking curve measurement was performed on this CoCrPtB (00.2) peak, and the obtained peak half-width was 12°.

When the recording/reproduction characteristics of this perpendicular magnetic recording medium were evaluated in the same manner as in Embodiment 1, the value of SNRm was 18.8 dB.

COMPARATIVE EXAMPLE 3

A perpendicular magnetic recording medium and testing medium were obtained following the same procedures as in Embodiment 9 except that on a nonmagnetic substrate, a 10-nm thick orientation control film was formed as an undercoating layer by using a sintered target made of 65 mass % of cobalt oxide ($Co_3O_4$) and 35 mass % of a mixture in which the molar ratio of silicon oxide ($SiO_2$) and titanium oxide ($TiO_2$) was 1:1, and no second undercoating layer was formed.

When the surface of the undercoating layer of the testing medium was observed with the TEM, crystal grains and a grain boundary region separating the crystal grains were found. The crystal grain size was approximately 12 to 14 nm.

TEM measurement was performed on the perpendicular magnetic recording layer of the obtained perpendicular magnetic recording medium, thereby checking the grain size distribution of the magnetic grains in the perpendicular magnetic recording layer. As a consequence, the magnetic grains had a grain size distribution of 13 to 15 nm.

When X-ray diffraction measurement was performed on this perpendicular magnetic recording layer, a CoCrPtB (00.2) peak was observed.

Rocking curve measurement was performed on this CoCrPtB (00.2) peak, and the obtained peak half-width was 14°.

When the recording/reproduction characteristics of the obtained perpendicular magnetic recording medium were evaluated in the same manner as in Embodiment 1, the value of SNRm was 15.2 dB.

COMPARATIVE EXAMPLE 4

A perpendicular magnetic recording medium and testing medium were obtained following the same procedures as in Comparative Example 3 except that cobalt oxide (CoO) having a composition different from that of cobalt oxide ($Co_3O_4$) was used as an undercoating layer instead of cobalt oxide ($Co_3O_4$).

When the surface of the undercoating layer of the testing medium was observed with the TEM, crystal grains and a grain boundary region separating the crystal grains were found. The crystal grain size was approximately 10 to 12 nm.

TEM measurement, X-ray measurement, rocking curve measurement, and recording/reproduction characteristic evaluation were performed on the obtained perpendicular magnetic recording medium in the same manner as in Embodiment 9. As a consequence, the magnetic grains had a grain size distribution of 10 to 12 nm.

When X-ray diffraction measurement was performed on this perpendicular magnetic recording layer, a CoCrPtB (00.2) peak was observed.

Rocking curve measurement was performed on this CoCrPtB (00.2) peak, and the obtained peak half-width was 13°.

When the recording/reproduction characteristics of the perpendicular magnetic recording medium were evaluated in the same manner as in Embodiment 1, the value of SNRm was 17.2 dB.

COMPARATIVE EXAMPLE 5

A perpendicular magnetic recording medium and testing medium were obtained following the same procedures as in Comparative Example 3 except that Cr-20 at % Ti was used as an undercoating layer instead of cobalt oxide ($Co_3O_4$).

When the surface of the undercoating layer of the testing medium was observed with the TEM, crystal grains and a grain boundary region separating the crystal grains were found. The crystal grain size was approximately 12 to 16 nm.

TEM measurement, X-ray measurement, rocking curve measurement, and recording/reproduction characteristic evaluation were performed in the same manner as in Embodiment 1. As a consequence, the magnetic grains had a grain size distribution of 13 to 16 nm.

When X-ray diffraction measurement was performed on this perpendicular magnetic recording layer, a CoCrPtB (00.2) peak was observed.

Rocking curve measurement was performed on this CoCrPtB (00.2) peak, and the obtained peak half-width was 11°.

When the recording/reproduction characteristics of this perpendicular magnetic recording medium were evaluated in the same manner as in Embodiment 1, the value of SNRm was 14.6 dB.

Embodiment 10

Perpendicular magnetic recording media and testing media were formed following the same procedures as for Embodiment 9 except that Pt-30 mol % $M_xC_y$ composite targets (M=Al, Hf, Nb, Ta, Ti, V, W, and Zr, x=1, 2, and 4, y=1 and 3) made of Pt and various metal carbides were prepared as second undercoating layers to make the materials of carbides in the second undercoating layers different from each other as shown in Table 7 below.

When the surface of the second undercoating layer of each testing medium was observed with the TEM, crystal grains and a grain boundary region separating the crystal grains were found. Also, the crystal grain size was approximately 5 to 9 nm.

TEM measurement, X-ray measurement, rocking curve measurement, and recording/reproduction characteristic evaluation were performed on the obtained perpendicular magnetic recording media in the same manner as in Embodiment 1. The results are shown in Table 7 below.

TABLE 7

| Carbide used | Grain size distribution (nm) of second undercoating layer | Grain size distribution (nm) of magnetic grains | Rocking curve half-width (°) | SNRm (dB) |
|---|---|---|---|---|
| $Al_4C_3$ | 7–9 | 8–10 | 8 | 23.0 |
| HfC | 6–9 | 6–9 | 9 | 23.2 |
| $Mo_2C$ | 6–9 | 7–10 | 8 | 22.5 |
| NbC | 6–9 | 7–10 | 8 | 22.5 |
| TaC | 5–8 | 5–9 | 6 | 22.8 |
| TiC | 5–7 | 6–8 | 8 | 22.6 |
| VC | 6–9 | 7–9 | 6 | 21.9 |
| WC | 5–8 | 6–8 | 8 | 22.2 |
| ZrC | 7–9 | 8–9 | 7 | 23.1 |
| Medium of Comparative Example 2 | 12–16 | 12–16 | 12 | 18.8 |

As shown in Table 7, characteristics better than those of the conventional medium of Comparative Example 2 were obtained when various carbides such as $Al_4C_3$, HfC, $MO_2C$, NbC, TaC, TiC, VC, WC, and ZrC were used.

Embodiment 11

Perpendicular magnetic recording media and testing media were formed following the same procedures as in Embodiment 9 except that Ru-20 mol % $MB_x$ composite targets (M=Al, Hf, Nb, Ta, Ti, V, W, Zr, Cr, Ce, La, and Sm, x=1, 2, and 6) made of Ru and metal borides were prepared as second undercoating layers to make the materials of borides in the second undercoating layers different from each other, and Ru forming crystal grains of the second undercoating layers were used as first undercoating layers.

When the surface of the second undercoating layer of each testing medium was observed with the TEM, crystal grains and a grain boundary region separating the crystal grains were found. Also, the crystal grain size was approximately 5 to 9 nm.

TEM measurement, X-ray measurement, rocking curve measurement, and recording/reproduction characteristic evaluation were performed on the obtained perpendicular magnetic recording media in the same manner as in Embodiment 9. The results are shown in Table 8 below.

TABLE 8

| Boride | Grain size distribution (nm) of second undercoating layer | Grain size distribution (nm) of magnetic grains | Rocking curve half-width (°) | SNRm (dB) |
|---|---|---|---|---|
| $AlB_2$ | 6–9 | 7–10 | 7 | 22.4 |
| $HfB_2$ | 6–8 | 7–8 | 9 | 22.4 |

TABLE 8-continued

| Boride | Grain size distribution (nm) of second undercoating layer | Grain size distribution (nm) of magnetic grains | Rocking curve half-width (°) | SNRm (dB) |
|---|---|---|---|---|
| $MoB_2$ | 6–9 | 7–9 | 8 | 23.0 |
| NbB | 6–9 | 7–10 | 8 | 22.5 |
| $NbB_2$ | 7–9 | 8–10 | 9 | 22.0 |
| TaB | 7–9 | 7–10 | 6 | 23.1 |
| $TaB_2$ | 5–8 | 6–9 | 7 | 23.1 |
| $TiB_2$ | 5–8 | 6–8 | 7 | 22.9 |
| $VB_2$ | 6–9 | 7–10 | 8 | 22.5 |
| WB | 6–8 | 6–8 | 9 | 22.4 |
| $ZrB_2$ | 5–7 | 5–8 | 7 | 21.9 |
| CrB | 7–9 | 8–10 | 8 | 22.3 |
| $CrB_2$ | 7–9 | 8–9 | 6 | 22.7 |
| $CeB_6$ | 6–8 | 6–9 | 6 | 23.3 |
| $LaB_6$ | 5–8 | 6–9 | 7 | 23.0 |
| $SmB_6$ | 5–9 | 6–10 | 8 | 22.9 |
| Medium of Comparative Example 2 | 12–16 | 12–16 | 12 | 18.8 |

As shown in Table 8, characteristics better than those of the conventional medium of Comparative Example 2 were obtained when various borides such as $AlB_2$, $HfB_2$, $MoB_2$, NbB, $NbB_2$, TaB, $TaB_2$, $TiB_2$, $VB_2$, WB, $ZrB_2$, CrB, $CrB_2$, $CeB_6$, $LaB_6$, and $SmB_6$ were used.

Embodiment 12

A perpendicular magnetic recording medium and testing medium were formed following the same procedures as in Embodiment 9 except that none of a Cr nonmagnetic layer, CoCrPt ferromagnetic layer, and CoZrNb soft magnetic layer was formed.

Figure 7:
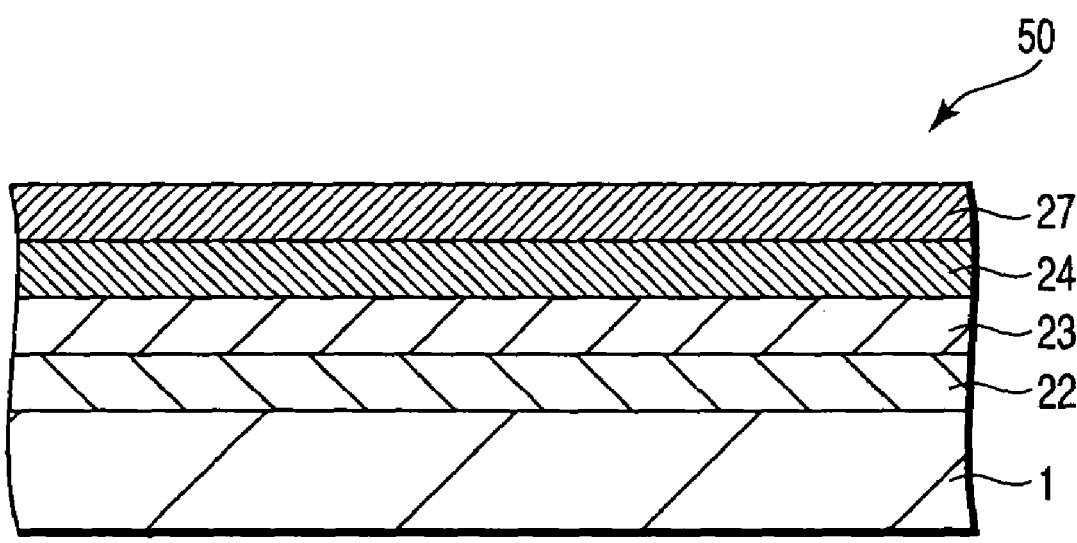
FIG. 7 is a sectional view showing the fifth example of the perpendicular magnetic recording medium of the present invention.

FIG. 7 is a sectional view showing the arrangement of still another example of the perpendicular magnetic recording medium of the present invention.

As shown in FIG. 7, a perpendicular magnetic recoding medium 50 has an arrangement in which a Pt first undercoating layer 22, Pt—$CeB_6$ second undercoating layer 23, CoCrPtB perpendicular magnetic recording layer 24, C protective layer 27, and lubricating film (not shown) are stacked in this order on a nonmagnetic substrate 1.

When the surface of the second undercoating layer of the testing medium was observed with the TEM, crystal grains and a grain boundary region separating the crystal grains were found. Also, the crystal grain size was approximately 5 to 7 nm.

TEM measurement, X-ray measurement, and rocking curve measurement were performed on the obtained perpendicular magnetic recording medium in the same manner as in Embodiment 9. As a consequence, the perpendicular magnetic recording layer had a grain size distribution of 5 to 8 nm.

When X-ray diffraction measurement was performed on this perpendicular magnetic recording layer, a CoCrPtB (00.2) peak was observed.

Rocking curve measurement was performed on this CoCrPtB (00.2) peak, and the obtained peak half-width was 5°.

The recording/reproduction characteristics of this perpendicular magnetic recording medium were evaluated by using a ring head using the magnetoresistance effect and having a recording track width of 0.25 μm and a reproducing track width of 0.15 μm. As a consequence, the value of SNRm was 21.5 dB.

COMPARATIVE EXAMPLE 6

A conventional perpendicular magnetic recording medium was formed following the same procedures as in Embodiment 12 except that a 5-nm thick Ti film was formed as a first undercoating layer by using a Ti target, and a 20-nm thick Ru film was formed as a second undercoating layer by using an Ru target.

The obtained perpendicular magnetic recording medium had the same layer arrangement as shown in FIG. 7 except for the first and second undercoating layers.

Also, a testing medium was obtained in the same manner as for the above perpendicular magnetic recording medium except that no perpendicular magnetic recording layer was formed on the Ru second undercoating layer.

The surface of the Ru second undercoating layer of the obtained testing medium was observed with the TEM. As a result, the crystal grain size was approximately 11 to 15 nm.

TEM measurement, X-ray measurement, and rocking curve measurement were performed on the obtained perpendicular magnetic recording medium in the same manner as in Embodiment 1. Consequently, the perpendicular magnetic recording layer had a grain size distribution of 11 to 15 nm.

When X-ray diffraction measurement was performed on this perpendicular magnetic recording layer, a CoCrPtB (00.2) peak was observed.

Rocking curve measurement was performed on this CoCrPtB (00.2) peak, and the obtained peak half-width was 11°.

The recording/reproduction characteristics of this perpendicular magnetic recording medium were evaluated by using a ring head using the magnetoresistance effect and having a recording track width of 0.25 μm and a reproducing track width of 0.15 μm. As a consequence, the value of SNRm was 16.8 dB.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A perpendicular magnetic recording medium comprising:
   a nonmagnetic substrate,
   a soft magnetic layer formed on the nonmagnetic substrate;
   first undercoating layer formed on the soft magnetic layer,
   a second undercoating layer formed on the first undercoating layer and having crystal grains and grain boundary region separating the crystal grains, and
   a perpendicular magnetic recording layer formed on the second undercoating layer,
   wherein the first undercoating layer contains at least one of the same elements forming the crystal grains of the second undercoating layer, the crystal grains contain at least one element selected from the group consisting of Pt, Ru, Y, Pd, Re and Rh, and
   the grain boundary material contains at least one boride selected from the group consisting of $AlB_2$, $HfB_2$, $MoB_2$, NbB, $NbB_2$, TaB, $TaB_2$, $TiB_2$, $VB_2$, WB, $ZrB_2$, CrB, $CrB_2$, $CeB_6$, $LaB_6$ and $SmB_6$.

2. A medium according to claim 1, wherein the second undercoating layer contains 1 to 50 mol % of the compound.

3. A medium according to claim 2, wherein the second undercoating layer contains 5 to 30 mol % of the compound.

4. A medium according to claim 1, wherein the crystal grains of the second undercoating layer have at least one of a face-centered cubic or hexagonal closest packed structure.

5. A medium according to claim 1, wherein the first undercoating layer contains not less than 60 at % of at least one of the same elements forming the crystal grains of the second undercoating layer.

6. A medium according to claim 1, wherein the perpendicular magnetic recording layer contains Co and Pt.

7. A magnetic recording/reproducing apparatus comprising:
   a perpendicular magnetic recording medium which comprises a nonmagnetic substrate,
   a soft magnetic layer formed on the nonmagnetic substrate;
   a first undercoating layer formed on the soft magnetic layer,
   a second undercoating layer formed on the first undercoating layer and having crystal grains and a grain boundary region separating the crystal grains, and
   a perpendicular magnetic recording layer formed on the second undercoating layer; and
   a recording/reproducing head,
   wherein the first undercoating layer contains at least one of the same elements forming the crystal grains of the second undercoating layer, the crystal grains contain at least one element selected from the group consisting of Pt, Ru, Y, Pd, Re, and Rh, and
   the grain boundary material contains at least one boride selected from the group consisting of $AlB_2$, $HfB_2$, $MoB_2$, NbB, $NbB_2$, TaB, $TaB_2$, $TiB_2$, $VB_2$, WB, $ZrB_2$, CrB, $CrB_2$, $CeB_6$, $LaB_6$, and $SmB_6$.

8. An apparatus according to claim 7, wherein the recording/reproducing head is a single-pole recording head.

9. An apparatus according to claim 7, wherein the second undercoating layer contains 1 to 50 mol % of the compound.

10. An apparatus according to claim 9, wherein the second undercoating layer contains 5 to 30 mol % of the compound.

11. An apparatus according to claim 7, wherein the crystal grains of the second undercoating layer have at least one of a face-centered cubic or hexagonal closest packed structure.

12. An apparatus according to claim 7, wherein the first undercoating layer contains more than 60 at % of at least one of the same elements forming the crystal grains of the second undercoating layer.

13. An apparatus according to claim 7, wherein the perpendicular magnetic recording layer contains Co and Pt.

* * * * *